Figure 1:
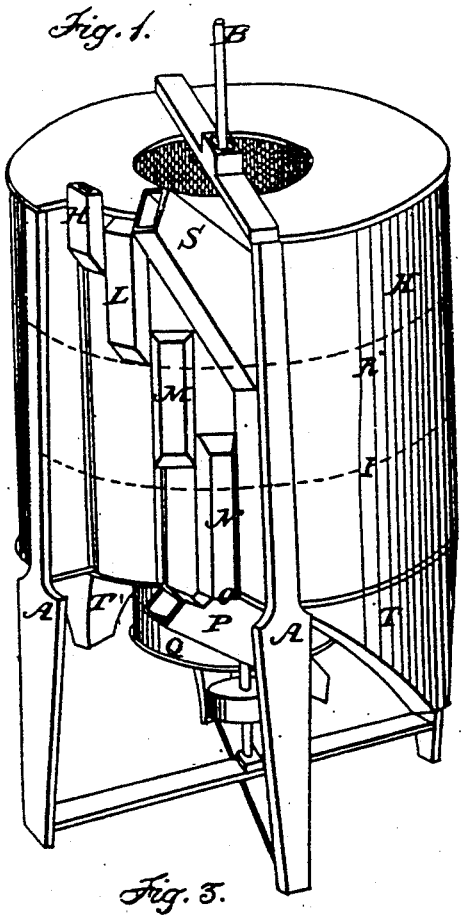
Figure 2:
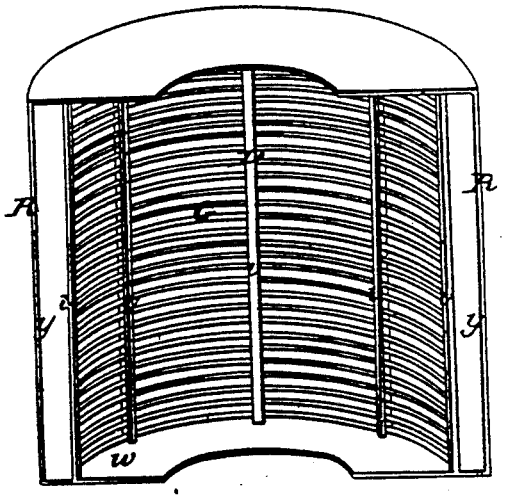
Figure 3:
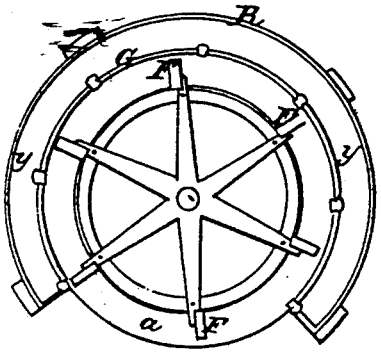
Figure 4:
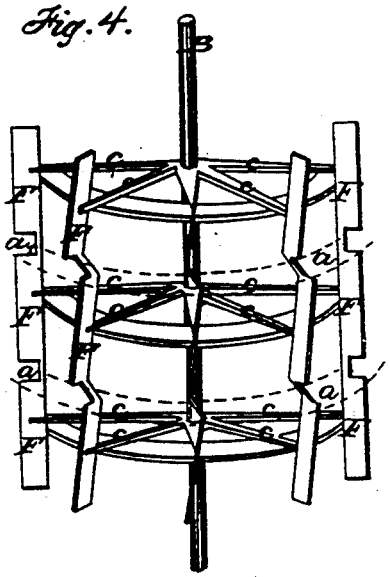

J. BENNER.

Smut Mill.

No. 108. — A. I. Patented Feb. 14. 1854.